June 1, 1971   R. H. ALEXANDER   3,581,409
THREE DIMENSIONAL SYMBOLIC ARRANGEMENT OF THE ELEMENTS
Filed April 25, 1969                    2 Sheets-Sheet 1
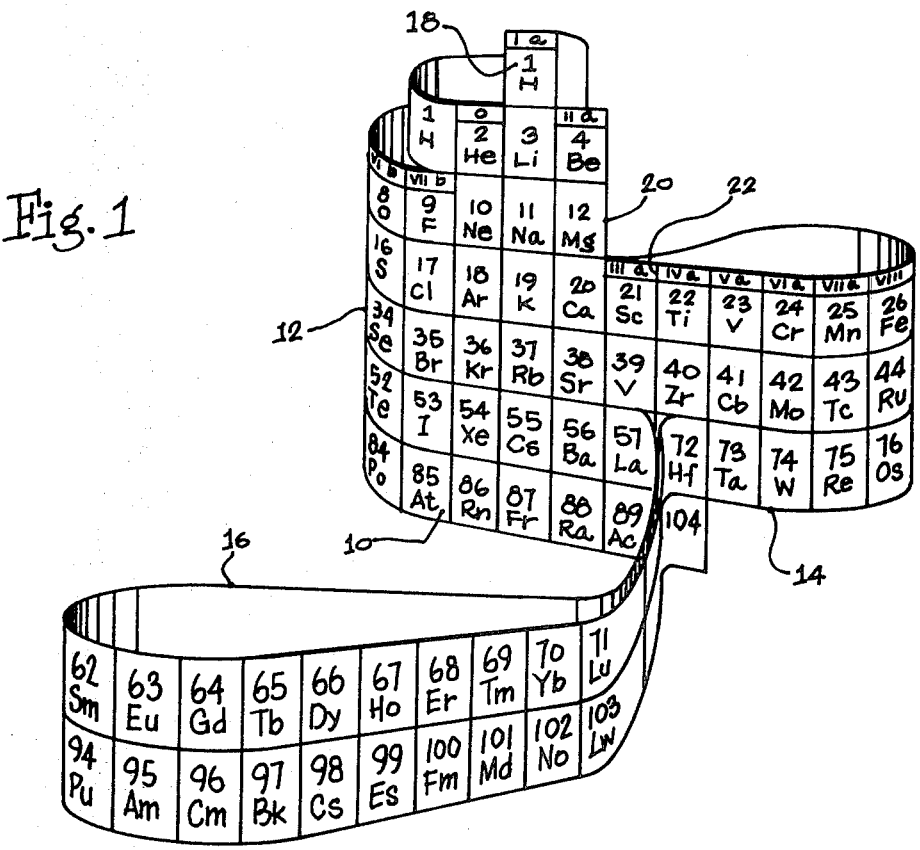
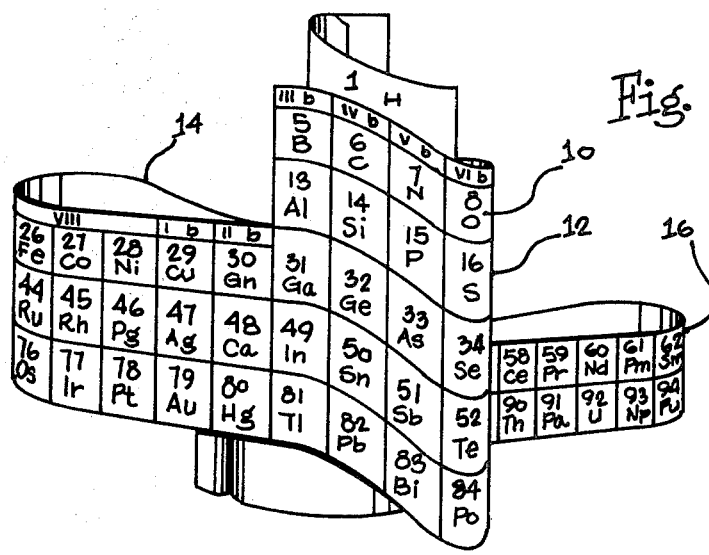
INVENTOR
Roy H. Alexander
BY John P. Gunnell
ATTORNEY

June 1, 1971      R. H. ALEXANDER      3,581,409

THREE DIMENSIONAL SYMBOLIC ARRANGEMENT OF THE ELEMENTS

Filed April 25, 1969      2 Sheets-Sheet 2

INVENTOR
Roy H. Alexander
BY
ATTORNEY

United States Patent Office 3,581,409
Patented June 1, 1971

3,581,409
THREE DIMENSIONAL SYMBOLIC ARRANGE-
MENT OF THE ELEMENTS
Roy H. Alexander, 15 Grandview Ave.,
Dobbs Ferry, Greenburgh, N.Y. 10522
Filed Apr. 25, 1969, Ser. No. 819,366
Int. Cl. G09b 23/24
U.S. Cl. 35—18          6 Claims

ABSTRACT OF THE DISCLOSURE

A three dimensional symbolic representation of the elements with fully grouped families including the Rare Earth series is presented in which the symbolic representations of the elements are arranged contiguously and continuously according to atomic number.

BACKGROUND OF THE INVENTION

The periodic law and periodic system of the elements was first developed by Mendeléeff in the period from 1868 to 1871. As only some 63 of the elements were known and methods for determining properties were still somewhat crude, organizing them into a simple planar arrangement was fairly obvious from Mendeléeff's statement that "if all the elements be arranged in the order of their atomic weights a periodic repetition of properties is obtained."

The late Henry D. Hubbard of the United States National Bureau of Standards modernized Mendeléeff's periodic table and his first work was published in 1924 by the W. M. Welch Manufacturing Company. This periodic table, at least now known as the "Periodic Chart of the Atoms," has been revised on a regular basis. A noble presentation, it has grown in complexity as more knowledge concerning the atom and the elements was developed by man. While containing a vast amount of information, it is regarded as somewhat too complex for young students of the sciences.

Other periodic tables have also been proposed. They are usually simpler only in the amount of information presented. With all a major deficiency exists in presenting a proper relationship of the Group VIII and Rare Earth and man made series elements to the remainder of the elements.

Having felt adding a third dimension to a symbolic representation of elements could eliminate many confusions, it was sought to determine if a three dimensional arrangement which would greatly simplify the orientation of a studen to the interrelationship of the elements could be devised.

SUMMARY OF THE INVENTION

It has now been found that symbolic representations of the elements can be presented contiguously and continuously according to atomic number without interrupting the accepted group interrelationships of the elements.

With reference to the "Periodic Chart of the Atoms" as published by W. M. Welch Manufacturing Company as pronouncing one accepted grouping of the elements and which is incorporated herein by reference, my arrangement comprises a composite of three spatial segments or units providing a contiguous arrangement of the symbolic representations of the elements according to atomic number, the major segment containing symbolic representations of the elements of Groups O, Ia, IIa, IIIb, IVb, Vb, VIb and VIIb, an intermediate segment communicating with the major unit at the intersection of Groups IIa and IIIb of the major unit and containing symbolic representations of the elements of Groups IIIa, IVa, Va, VIa, VIIa, VIII, Ib and IIb; and a minor segment communicating with the intermediate unit at the intersection of Groups IIIa and IVa and containing symbolic representations of the elements of the Rare Earth series.

DRAWINGS

FIG. 1 is a perspective view of a three dimensional composite arrangement of symbolic representations of the elements according to contiguous atomic number showing the relative assignment of a fair percentage of the symbols of the elements contained in each segment thereof.

FIG. 2 is another perspective view of a three dimensional composite arrangement of the symbolic representations of the elements according to contiguous atomic number showing the relative assignment of the balance of the symbolic representations of the known elements contained in each segment thereof.

FIG. 3 is a representation of the information which can be advantageously provided in any one of the position assignments for a symbol of an element contained in any one of the segments.

FIG. 4 is a planar layout of a symbolic representation of the elements, shown somewhat proportioned in favor of the vertical, from which a three dimensional structure of a symbolic representation of the elements according to contiguous atomic number can be constructed.

THE DESCRIPTION

According to the present invention there is provided a contiguous representation of the symbols of the elements in which all are continuously and sequentially arranged according to atomic number without interruption in atomic number.

The position of the symbols of the elements in a three dimensional periodic arrangement according to this invention are depicted in FIGS. 1 and 2.

Referring first to FIG. 1 a three dimensional composite unitary arrangement of the symbols of the elements 10 consists of three segments which provide a successive, continuous, and contiguous symbolic arrangement of the symbols of the elements by atomic number. The major segment 12 contains respectively the symbols of the more common or basic elements of Groups O, Ia, IIa, IIIb, IVb, Vb, VIb and VIIb of the "Periodic Chart of the Atoms." To provide continuity by atomic number, the symbols of the elements in unit 12 descend by atomic number preferably taking the slightly spiral-like arrangement shown, to properly connect groups IIa and IIIb as hereinafter explained. The elements may also decline in a stepwise or any other convenient fashion without departing from the spirit of this invention. In this segment the position for the symbol for Hydrogen 18 is shown to begin at Group Ia and transverse Groups Ia, IIa, IIIb, IVb, Vb, VIb and VIIb to preferably depict the accepted acknowledged activity of hydrogen, the basic element, with members of such groups. In the known arrangement the symbols of the elements of Groups IIa and IIIb provide a common interface 20 for cooperating association with segment 14.

The second segment 14 contains the symbols of the transition elements of Groups IIIa, IVa, Va, VIa, VIIa, VIII, Ib and IIb which are acknowledged as the Transition Metals. Segment 14 cooperates with segment 12 by providing joinder with interface 20 of Groups IIa and IIIb to afford continguous arrangement of the elements by atomic numbers.

Segment 16 cooperates with segment 14 by providing joinder at interface 22 between Groups IIIa, and IVa of the transition metals to incorporate symbols of the Rare Earth series elements which includes the Uranium Metals and the man made elements and allows expansion into segment 14 for the addition of new elements like the element of atomic number 104 and the like and retractable for simplification.

FIG. 2 is essentially a rear view of a three dimensional periodic arrangement of the elements provided according to this invention and shows the position of the symbols of elements not shown in FIG. 1. In particular, segment 12 shows the symbols of elements of Groups IIIb, IVb, Vb, VIb and VIIb. Segment 14 shows the balance of the symbols of the elements of the Transition Metals, namely Groups VIII, Ib and IIb, while segment 16 shows the balance of the symbols of the Rare Earth and Uranium Metals.

The arrangement of the elements in a manner set forth in FIGS. 1 and 2 provide a relationship between the symbols of the elements which is not present in any planar periodic table. Most significant is that in three dimension there is provided a continuous and contiguous arrangement of the symbols of the elements by atomic number in which the viewer starting at the symbol for Hydrogen and following the symbols around the table according to the way they are positioned naturally can reach the last known element without a single disruption in the sequence of atomic numbers with complete expansion for new elements as they are discovered or synthesized. Further, there is also a more natural relationship between the normal valences of the elements. For example, at the face of Groups IIa and IIIb, which comprise the elements which normally have the valences 2 and 3 respectively there is provided association with symbols of the Transition elements and the Rare Earth and Uranium Metal series all of which are normally associated as having a valence of at least 2 and/or 3. The symbols of the elements having normally lower or higher valences are then contained in the balance of segment 12.

It also provides a most precise positioning for the symbols of the Rare Earths with respect to Groups IIIa and IVa of the Periodic Table. In all prior periodic tables the Rare Earths have been heretofore set apart from the main body of the table and associated with the table only by loose reference. Now they are an integral part of an arrangement to provide the contiguous continuum of the elements by atomic number.

FIG. 3 is a representation of information concerning the elements which can be provided with any of the symbolic representations. The information shown is for the element Sulfur and includes name, atomic number, letter symbol, atomic weight, density, valence and the number of electrons in its designated electron shells. While this is a preferred presentation of information there may be any degree of subtraction or addition of information for any of the elements. While no wise limiting, there is included herein by reference "Key to Periodic Chart of the Atoms" Meggers, W.M. Welch Scientific Company (1956), as a source of information which may be included for any one of the elements.

FIG. 4 is a representation of a planar pattern which will yield a three dimensional periodic arrangement of the symbols of the elements according to this invention. It will be evident this pattern can be reproduced on single sheets of paper, plastic or the like. When produced in this fashion and essentially cut out along its borders and along the border between the traversing hydrogen segment 24 and the columns assigned to contain the symbols of the elements of Groups IIIb, IVb, Vb, VIb and VIIb, the arrangement will readily fold to the three dimensional periodic arrangement of the elements according to this invention. Segment 12 of FIGS. 1 and 2 is formed by fastening the tab of column 24 behind the prime position assigned to Hydrogen 18 and fastening tab 26 behind the boron and Aluminum assignments in column 28. Segment 14 is then formed by fastening tab 30 to the rear of column 32 so as to provide the next step in forming contiguous arrangement of the symbols of elements by atomic number. The arrangement is then completed by the formation of segment 16 which is formed by looping section 34 and fixing it to segment 14 so that elements of column 36 and column 38 of section 34 are superimposed over their counterparts in segment 14.

While the assignments of the symbols of elements in this planar view are shown rectangular for convenience they may take any other shape such as the square shape of FIG. 3 and the like as well as differing shapes as depending on the desired end use. They may also be of any or differing colors particularly for defining groups or families of the elements.

Although the composite three dimensional periodic arrangement of elements of this invention is shown in unit construction, it will be appreciated that many other variations are possible. One is an arrangement of three separate units which may but need not be interlockable. Since the three dimensional periodic arrangement serves as an educational and informational device, construction as separate but associative units can enhance interest of the very young of this very necessary part of the sciences. Initially a toy, later a source of reference.

It is also conceivable to create a framework for the symbolic representation of elements for insertion of elements by number, color, shape or the like. This arrangement would provide game as well as educational aspects.

It is also conceivable to use the three dimension shape to additional advantages. For instance, the composite can be constructed to serve as a multi-container unit for the desk to hold pencils and the like. This arrangement would have day to day use and always remain constantly at hand as a reference source.

A most important use naturally, is educational as the arrangement of the elements according to this invention will add to understanding of a student of the sciences. Since the precursor can be made planar it is evident it can be made from paper, plastics filled polyethylene and the like and packaged at low cost for sale and home assembly by the student.

More rigid composite units can be constructed of cardboard, plastics, wood, metal and the like and of any size.

It is apparent that many widely different variations of my invention may be made without departing from the spirit and scope thereof.

It is also apparent that while the description of the periodic arrangement of the elements of my invention has been described in the terms of the grouping or families of elements as set forth in the Hubbard "Periodic Chart of the Atoms" as revised by Meggers, it is evident that alternative arrangements designated in more simplified or different terminology are construed within the ambit of this invention so long as the arrangement of the symbols of the elements is essentially contiguous and continuous as set forth in the appendent claims.

For example, the periodic arrangement of the elements according to my invention may be presented as a three dimensional composite having a major segment providing positions for elements having atomic numbers from 1 to 20, 31 to 38, 49 to 56 and 81 to 88 respectively and a first associative interface defined by interfacial communication of columns respectively providing positions for symbolic representations of elements having atomic numbers 5, 13, 31, 49, 81 and 4, 12, 20, 38, 56, 88; an intermediate segment providing positions for symbolic represenations of elements having atomic numbers 21 to 30, 39 to 48, 57, 72 to 80 and at least 89 preferably including positions for new elements having atomic numbers from 104 on and a second associative interface by interfacial communication of columns providing position for symbolic representations of elements having atomic numbers 21, 39, 57, 89 and 30, 48, 80 respectively for communicating with the first interface and a minor segment providing at least positions for symbolic representations of elements having atomic numbers from 58 to 71 and 90 to 103, and a third associative by interfacial communication of columns providing positions for symbolic representations of elements having atomic numbers 58, 90 and 71, 103 respectively for communicating association with the associative interface formed by columns containing positions assignments for symbolic representations of the elements having atomic numbers 57, 89 and 72, 104 respectively. In this arrangement any desired number of the symbolic representations of the elements may be shown in the positions provided.

I claim:

1. A three dimensional structure for providing a periodic arrangement of symbolic representations of the elements comprising a composite unit of three segments providing contiguous and continuous arrangement of contained symbolic representations of the elements according to atomic number, said composite having
   (1) a major segment providing positions for symbolic representations of the elements having atomic numbers from 1 to 20, 31 to 38, 49 to 56 and 81 to 88 and providing a first associative interface defined by interfacial communication columns respectively providing positions for symbolic representations of the elements having atomic numbers 5, 13, 31, 49, 81 and 4, 12, 20, 38, 56, 88;
   (2) an intermediate segment providing positions for symbolic representations of elements having atomic numbers 21 to 30, 39 to 48, 57, 72 to 80 and at least 89 and providing a second associative interface by interfacial communication of columns providing positions for symbolic representations of elements having atomic numbers 21, 39, 57, 89 and 30, 48, 80 respectively for communicating association with said first associative interface; and
   (3) a minor segment providing positions for symbolic representations of elements having atomic numbers from at least 58 to 71 and 90 to 103 and providing a third associative interface by interfacial communication of columns providing positions for symbolic representations of elements having atomic numbers 58, 90, and 71, 103 respectively for communicating association with said intermediate segment at an associative interface of columns containing position assignments for symbolic representations of the elements having atomic numbers 57, 89 and 72, 104.

2. The three dimensional structure of claim 1 in which the positions for the elements are grouped according to the Periodic Law and Periodic System as defined by Mendeléeff.

3. The three dimensional structure of claim 2 in which the composite structure is unitary.

4. A three dimensional periodic arrangement of symbolic representations of the elements comprising a composite of three segments providing contiguous and continuous positions for grouped symbolic representations of the elements according to atomic number according to the Periodic Law and Periodic System defined by Mendeléeff, said composite having
   (a) a major segment containing symbolic representations of the elements of Groups O, I$a$, II$a$, III$b$, IV$b$, V$b$, VI$b$, and VII$b$ and providing a communicating first interface between Groups II$a$ and III$b$ thereof;
   (b) an intermediate segment communicating with said major segment at said first interface, said intermediate segment containing symbolic representations of the elements of Groups III$a$, IV$a$, V$a$, VI$a$, VII$a$, VIII, I$b$ and II$b$, and providing a communicating second interface between groups III$a$ and II$b$ thereof of communicating association with said first interface; and
   (c) a minor segment communicating with said intermediate segment at the associative interface between Groups III$a$ and IV$a$ thereof, said minor segment containing symbolic representations of the elements of the Rare Earth series.

5. The three dimensional periodic arrangement of symbolic representations of the elements of claim 4 in which the segments are interconnected.

6. A three dimensional periodic arrangement of symbolic representations of the elements as claimed in claim 4 in which a portion of the symbolic representations of the elements contained in the major segment are presented in substantially spiral arrangement.

References Cited

UNITED STATES PATENTS

| | | | |
|---|---|---|---|
| 995,466 | 6/1911 | Jones | 40—118X |
| 2,998,666 | 9/1961 | Stern | 40—114 |

OTHER REFERENCES

Periodic Chart of the Atoms, copyright Welch Sci. Co., Business Week Magazine, p. 56, Apr. 10, 1965.

HARLAND S. SKOGQUIST, Primary Examiner

U.S. Cl. X.R.

40—118